(12) United States Patent
Lee et al.

(10) Patent No.: US 10,634,916 B2
(45) Date of Patent: Apr. 28, 2020

(54) WEARABLE DISPLAY DEVICE

(71) Applicant: LG Innotek Co., Ltd., Seoul (KR)

(72) Inventors: Sang Hun Lee, Seoul (KR); Jung In Jang, Seoul (KR); Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 74 days.

(21) Appl. No.: 15/537,756

(22) PCT Filed: Dec. 14, 2015

(86) PCT No.: PCT/KR2015/013652
§ 371 (c)(1),
(2) Date: Jun. 19, 2017

(87) PCT Pub. No.: WO2016/099090
PCT Pub. Date: Jun. 23, 2016

(65) Prior Publication Data
US 2018/0011323 A1      Jan. 11, 2018

(30) Foreign Application Priority Data

Dec. 17, 2014   (KR) .................. 10-2014-0182065
Dec. 24, 2014   (KR) .................. 10-2014-0188549

(51) Int. Cl.
*G02B 27/01*     (2006.01)
*G02B 27/28*     (2006.01)
(Continued)

(52) U.S. Cl.
CPC ........... *G02B 27/0172* (2013.01); *G02B 1/10* (2013.01); *G02B 5/04* (2013.01); *G02B 27/0176* (2013.01);
(Continued)

(58) Field of Classification Search
CPC ...... G02B 2027/011; G02B 2027/0118; G02B 2027/0149; G02B 2027/015;
(Continued)

(56) References Cited

U.S. PATENT DOCUMENTS

2013/0070338 A1    3/2013  Gupta et al.
2014/0063055 A1*   3/2014  Osterhout ............... G06F 3/005
                                                      345/633

FOREIGN PATENT DOCUMENTS

JP    H11-249037 A    9/1999
JP    2001-147400 A   5/2001
(Continued)

OTHER PUBLICATIONS

International Search Report in International Application No. PCT/KR2015/013652, filed Dec. 14, 2015.

*Primary Examiner* — Marin Pichler
(74) *Attorney, Agent, or Firm* — Saliwanchik, Lloyd & Eisenschenk

(57) ABSTRACT

A wearable display device according to an embodiment may comprise: a first prism, positioned in front of a user's eye, for controlling the path of an incident light and enabling the arrival of a virtual image to be displayed on the eye; a second prism, coupled to the first prism, for reducing distortion of a real image arriving at the user's eye; and a coating layer which is interposed between the first prism and the second prism and of which the brightness is controlled in inverse proportion to the ambient brightness, such that the visibility of the virtual image increases.

17 Claims, 10 Drawing Sheets

(51) Int. Cl.
*G02B 3/04* (2006.01)
*G02B 5/04* (2006.01)
*G02B 1/10* (2015.01)

(52) U.S. Cl.
CPC .............. *G02B 27/283* (2013.01); *G02B 3/04* (2013.01); *G02B 2027/011* (2013.01); *G02B 2027/015* (2013.01); *G02B 2027/0118* (2013.01); *G02B 2027/0152* (2013.01); *G02B 2027/0178* (2013.01)

(58) Field of Classification Search
CPC .... G02B 2027/0152; G02B 2027/0178; G02B 2027/012; G02B 2027/121; G02B 2027/013; G02B 2027/0172; G02B 2027/0176; G02B 27/017; G02B 27/0172; G02B 27/0176; G02B 27/0179; G02B 27/01; G02B 27/0101
USPC .................................. 359/630–633; 345/7–9
See application file for complete search history.

(56) References Cited

FOREIGN PATENT DOCUMENTS

| | | | |
|---|---|---|---|
| JP | 2004-233908 | A | 8/2004 |
| JP | 3720464 | B2 | 11/2005 |
| JP | 2008-122511 | A | 5/2008 |
| KR | 10-0762861 | B1 | 10/2007 |

\* cited by examiner

WEARABLE DISPLAY DEVICE

CROSS-REFERENCE TO RELATED APPLICATIONS

This application is the U.S. national stage application of International Patent Application No. PCT/KR2015/013652, filed Dec. 14, 2015, which claims priority to Korean Application Nos. 10-2014-0182065, filed Dec. 17, 2014, and 10-2014-0188549, filed Dec. 24, 2014, the disclosures of each of which are incorporated herein by reference in their entirety.

TECHNICAL FIELD

Embodiments relate to a wearable display device.

BACKGROUND ART

A wearable display device, such as, for example, a head-mounted display (HMD), is a device that is devised to let a pilot know flight information including, for example, the altitude and speed of an airplane. General commercial products were invented in the 1990s, and commercialized products have received great attention since 1997.

A wearable display device is a device that is worn on the head, like a pair of glasses, so that an enlarged image is formed in front of the user's eyes so as to allow the user to view the image, and a display having a size of 1 inch or less is generally used therein, but the user can view an enlarged screen approaching 100 times the actual size through the application of high-grade optical technology.

The growth of the wearable computing industry is expected due to the technical development and commercialization of peripheral appliances such as wearable display devices. Although current wearable display devices have mainly been developed for the enjoyment of movies or games, owing to the higher performance and smaller size of computer systems and to the rapid development of display apparatuses, which are exemplarily represented by LCDs and LEDs and of image communication technology, wearable display devices have recently been studied and developed for use as wearable monitors, and commercialized products thereof have been launched.

Although the wearable display device market has encountered difficulty in the past due to relatively high prices, it is expected that the market will rapidly grow along with the wearable computer industry. The application fields of wearable display devices are expected to expand to industrial sites, sites for the maintenance of bulky products such as, for example, cars, airplanes, and ships, and warehouses, as well as to sports entertainment, such as car racing.

In particular, the development of processor and software technologies enables a reduction in the size of computing apparatuses, and wearable display devices are expected to be developed for use in personal-computing apparatuses, such as smart phones, rather than serving as a device that merely displays an image.

A wearable display device has a structure that enables a user to view an image of a real object, which is present in front of the user, i.e. a real image, and a playback imaginary image, i.e. a virtual image, with the naked eye. Thus, when the ambient brightness around the area on which a virtual image is projected is high, the degree to which the user visually perceives the virtual image, i.e. the visibility of the virtual image, may be low. Even when the ambient brightness around the area on which the virtual image is projected is low, the visibility may also be low.

With a reduction in the size of various electronic parts or optical elements, a wearable display device is used in various configurations, such as in a fashion capable of being worn on an observer. When a wearable display device is worn on an observer in the form of a pair of glasses or the like, the observer is capable of easily viewing a virtual image combined with the real-world environment image around the observer.

In the case of such a wearable display device configured to be worn on the observer to display a virtual image to the observer, a reduction in the size and the weight thereof is required in order to improve user convenience, and various research regarding this is in progress.

DISCLOSURE

Technical Problem

Therefore, embodiments provide a wearable display device capable of improving the visibility of a playback image.

Further, embodiments provide a small-sized and light-weight wearable display device.

Technical Solution

A wearable display device according to a first embodiment may include a first prism disposed in front of an eyeball of a user to allow a displayed virtual image to reach the eyeball by adjusting a path of light introduced thereto, a second prism coupled to the first prism to reduce distortion of a real image that reaches the eyeball of the user, and a coating layer interposed between the first prism and the second prism, the coating layer being configured such that a brightness thereof is adjusted in inverse proportion to an ambient brightness so as to improve a visibility of the virtual image.

A wearable display device according to a second embodiment may include a light source, a first beam splitter for transmitting light emitted from the light source, an image generator for generating a light pattern forming a virtual image from the light transmitted from the first beam splitter, the image generator being disposed in an inclined manner at a first predetermined angle with respect to a viewing axis, a front prism for totally reflecting light, corresponding to the light pattern generated by the image generator and being reflected by the first beam splitter, a predetermined number of times, and a second beam splitter disposed in the front prism in an inclined manner at a second predetermined angle with respect to the viewing axis to reflect the totally reflected light along the viewing axis.

Advantageous Effects

According to a wearable display device of the embodiments, a reflective layer is disposed in an upstream portion of a path of light that forms a virtual image, a coating layer is disposed in a downstream portion of the path of light, and the brightness of a reflective layer is adjusted in inverse proportion to the ambient brightness, which has the effect of improving the visibility of the virtual image.

In addition, since the reflective layer and the coating layer are respectively coated on a first inclined surface and a second inclined surface, which are surrounded by the edge of the end of a first prism and the edge of the end of a second prism, the layers are not exposed outside the prisms. Accordingly, the occurrence of scratches or damage, particularly attributable to external exposure of the coating layer, is greatly reduced, and consequently the durability of the coating layer is enhanced.

According to a wearable display device of the embodiments, it is possible to prevent distortion of a real-world environment image around an observer, which the observer views with the observer's eye, to show a virtual image having an ultrahigh resolution, for example, a high-pixel virtual image having an HD resolution, to the observer with improved light efficiency, and to achieve reduction in the size and the weight of the wearable display device, thus enabling the observer to conveniently wear the same.

BEST MODE

Figure 1:
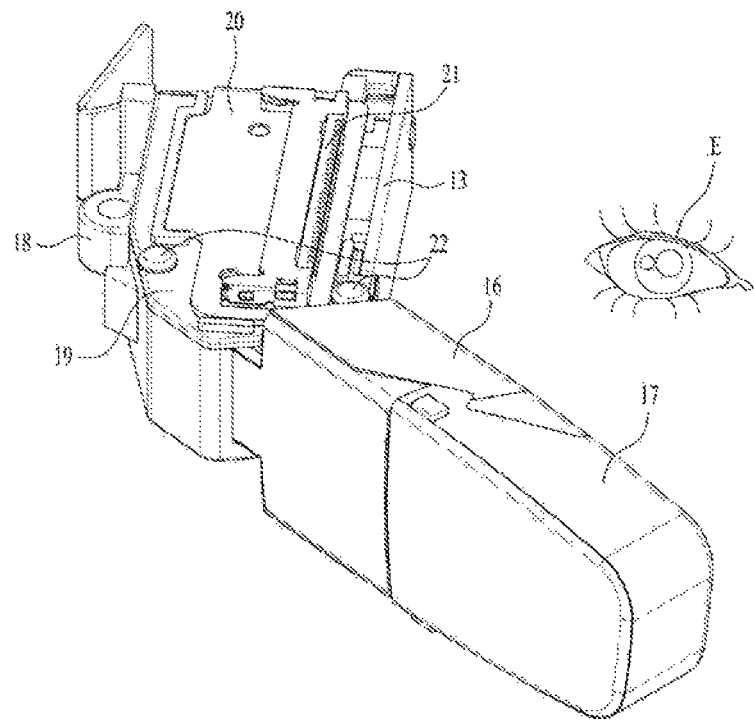
FIG. 1 is a perspective view illustrating a wearable display device according to a first embodiment.

Hereinafter, embodiments will be described in detail with reference to the accompanying drawings. While the disclosure is susceptible to various modifications and alternative forms, specific embodiments thereof are shown by way of example in the drawings and are explained in detail in the description. However, the disclosure should not be construed as being limited to the embodiments set forth herein, but on the contrary, the disclosure is intended to cover all modifications, equivalents, and alternatives falling within the spirit and scope of the embodiments. In the drawings, the sizes and shapes of elements may be exaggerated for convenience and clarity of description.

It may be understood that, although the terms "first," "second," etc. may be used herein to describe various elements, these elements should not be limited by these terms. These terms are generally only used to distinguish one element from another. In addition, terms particularly defined in consideration of construction and operation of the embodiments are used only to describe the embodiments, but do not define the scope of the embodiments.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

In addition, relational terms, such as "on/upper part/above" and "under/lower part/below," are used only to distinguish between one subject or element and another subject or element without necessarily requiring or involving any physical or logical relationship or sequence between such subjects or elements.

In addition, an orthogonal coordinate system (x, y, z) may be used in the drawings. In each drawing, the x-axis and the y-axis are perpendicular to an optical-axis direction, and for convenience, the optical-axis direction (the z-axis direction) may be referred to as a first direction, the x-axis direction may be referred to as a second direction, and the y-axis direction may be referred to as a third direction.

A wearable display device according to the embodiments is a device that is wearable on the human body, like a pair of glasses, and allows a human to view an image transmitted from an external apparatus with fewer limitations as to place. The apparatus, which is the source of the transmitted image, may be a smart phone or any other mobile appliance, and may be connected to the wearable display device in a wired or wireless manner.

At this time, in order to wear the wearable display device according to the embodiments, the wearable display device may be removably coupled to glasses, or may be coupled to a separate wearable appliance, which may be worn on the user in the manner of a pair of glasses.

First Embodiment

Figure 2:
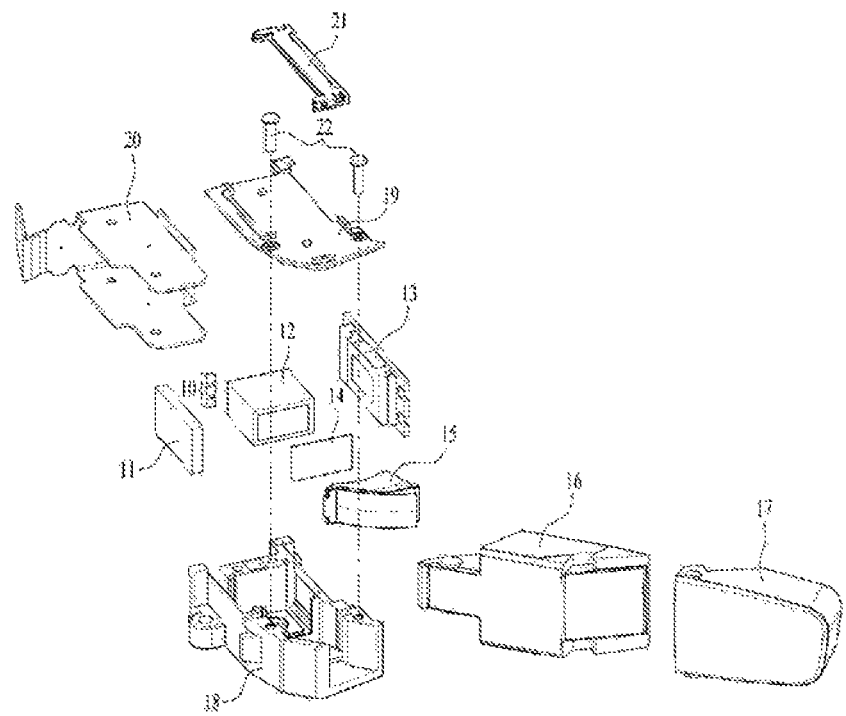
FIG. 2 is an exploded perspective view illustrating the wearable display device according to the first embodiment.
Figure 3:
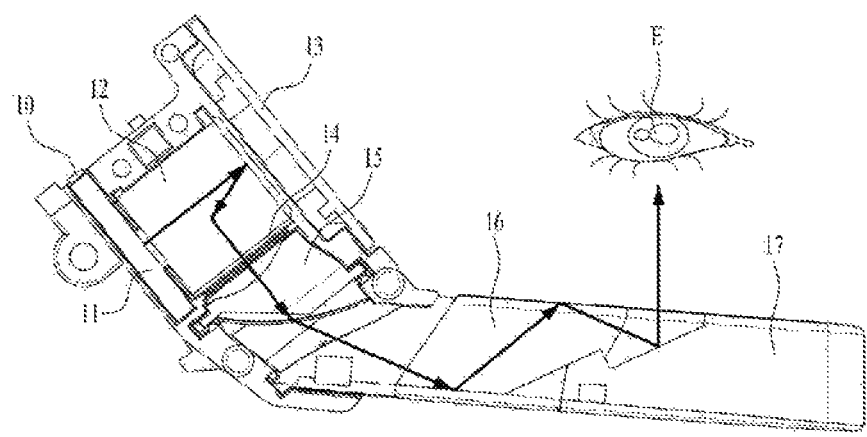
FIG. 3 is a plan view illustrating a path of light that forms a virtual image in the wearable display device according to the first embodiment.

FIG. 1 is a perspective view illustrating a wearable display device according to a first embodiment. FIG. 2 is an exploded perspective view illustrating the wearable display device according to the first embodiment. FIG. 3 is a plan view illustrating a path of light that forms a virtual image in the wearable display device according to the first embodiment.

The wearable display device according to the embodiment may include a light source unit 10, a light guide unit 11, a beam ejection unit 12, a display unit 13, a polarizer 14, a lens 15, a first prism 16, and a second prism 17.

In addition, the wearable display device according to the embodiment may include a base 18, a cover member 19, and fastening members 22, in order to couple the respective components mentioned above into a bundle. In addition, the wearable display device of the embodiment may include a printed circuit board 20 and a connector 21, which may electrically connect the wearable display device to an external apparatus, and may allow the wearable display device to receive a playback image from the external apparatus.

The light source unit 10 may be electrically connected to the printed circuit board 20, and may serve to perform first emission of a playback image, which is transmitted from the external apparatus via the printed circuit board 20, in the form of light. The light source unit 10 may be formed of various devices that emit light, and, for example, may be formed of small LEDs, which have excellent durability and emit less heat.

The light guide unit 11 may serve to adjust the path of light so that the image light emitted from the light source unit 10 is directed to the beam ejection unit 12. As shown in FIG. 3, when viewing the vicinity of the light guide unit 11, the light source unit 10 and the beam ejection unit 12 are arranged approximately perpendicular to each other. As such, in order to direct the light that forms an image and is emitted from the light source unit 10 to the beam ejection unit 12, the light guide unit 11 may include a plurality of lattices, which are located at appropriate positions and are oriented at appropriate angles within the light guide unit 11.

In addition, the light guide unit 11 may serve to uniformly distribute the light, emitted from the light source unit 10, to the beam ejection unit 12, through the provision of the lattices. Accordingly, the light, uniformly emitted from the light guide unit 11, may be uniformly introduced to the surface of the beam ejection unit 12 that is close to the light guide unit 11.

The beam ejection unit 12 may serve to emit the light, introduced from the light guide unit 11, to the display unit 13, and to emit a playback image, received from the display unit 13, to the lens 15 in order to allow a user to view the image at full length with the naked eye.

That is, the beam ejection unit 12 may transmit light to the display unit 13 or may receive the light that forms a playback image from the display unit 13, and may adjust the path of the light that forms the playback image and is received from the display unit 13.

In order to form the path of light, the beam ejection unit 12 may take the form of a polarizing beam splitter (PBS), for example. The polarizing beam splitter may be manufactured by coupling a plurality of lattices and forming a coating layer 100, which is capable of reflecting and/or diffracting light, on each lattice.

The display unit 13 serves to convert the light introduced from the beam ejection unit 12 into a playback image, the form of which the user is capable of concretely detecting with the naked eye. The display unit 13 may be, for example, a reflective display, which emits the playback image back to the beam ejection unit 12.

The reflective display may be of, for example, an Lcos type. The Lcos-type reflective display plays an image back by reflecting the light introduced thereinto. In the Lcos type, a silicon substrate is mainly used as a display device, and a high-resolution image may be displayed on a small display screen.

The polarizer 14 may serve to polarize the image-forming light introduced from the display unit 13. The polarizer 14 may serve to transmit a p-wave component of the introduced image-forming light and absorb an s-wave component of the introduced image-forming light.

At this time, the p-wave is a light wave that vibrates in the direction parallel to an incident plane, and the s-wave is a light wave that vibrates in the direction perpendicular to an incident plane. Here, "incident plane" refers to a plane that is defined by an incident light wave, a reflected light wave, and a transmitted light wave in a medium into which light is introduced.

The polarizer 14 transmits only the p-wave light, among the introduced light, and therefore the light that passes through the polarizer 14 and is introduced to the lens 15 includes only the p-wave component. Of course, conversely, the light that passes through the polarizer 14 and is introduced to the lens 15 may include only the s-wave component when some other kind of polarizer 14 is used.

The above-mentioned polarizer 14 may prevent deterioration in image quality due to interference between the p-wave component and the s-wave component of light caused when the introduced light that forms an image includes both the p-wave component and the s-wave component.

Meanwhile, in the same manner as the polarizer 14, the light guide unit 11 may have a polarization function so as to prevent deterioration in image quality due to the inference between the p-wave component and the s-wave component of light by polarizing the light introduced from the light source unit 10.

The lens 15 may serve to receive the image-forming light introduced from the polarizer 14 and enlarge an image. That is, because the image formed by the light introduced from the polarizer 14 is very small, it is inconvenient for the user to view the image. Therefore, the lens 15 serves to enlarge the image to a size suitable for viewing by the user with the naked eye.

The light, which has formed the enlarged image by passing through the lens 15, is introduced to the first prism 16. At this time, in order to appropriately adjust the path of the light introduced from the lens 15 to the first prism 16, a refractor may be formed on a portion of the lens 15 as needed. The refractor may be formed, for example, by coupling a medium, having a different density from the remaining portion of the lens 15, to a portion of the lens 15.

The first prism 16 may serve to allow the image transmitted from the lens 15 to reach the user's eyeball E. To this end, the path of the image-forming light introduced from the lens 15 needs to be appropriately adjusted. The adjustment of the path of light may be accomplished using total reflection in the first prism 16, and a reflective layer 200, which will be described later, may be formed on the first prism 16 in order to adjust the final path of the light that is introduced to the user's eyeball E.

At this time, the image, which is directed from the lens 15 to the user's eyeball E through the first prism 16, is a virtual image. That is, unlike a real image, which is an image of a real object located in front of the user's eyeball E, the image is a virtual image that the user visually perceives, which is not located in front of the user's eyeball E, but is played back on the display unit 13 as if it were located in front of the user's eyeball E owing to the adjustment of the path of light, as described above.

In the wearable display device of the embodiment, the path of the light that forms the virtual image is as illustrated in FIG. 3. Specifically, first, the light source unit 10 electrically connected to the printed circuit board 20 emits light to the light guide unit 11.

Subsequently, the light guide unit 11 adjusts the path of the light introduced from the light source unit 10 so that the light is directed to the beam ejection unit 12. At this time, the light guide unit 11 may serve to uniformly distribute the light emitted from the light source unit 10 to the beam ejection unit 12 owing to the lattices thereof. In addition, the light guide unit 11 may have a polarization function so as to prevent deterioration in image quality due to interference between the p-wave component and the s-wave component of light by polarizing the light introduced from the light source unit 10.

Subsequently, the beam ejection unit 12 may emit the light, introduced from the light guide unit 11, to the display unit 13.

Subsequently, the display unit 13 plays back an image, and the light including the playback image is emitted back to the beam ejection unit 12.

Subsequently, the beam ejection unit 12 emits the image-forming light, introduced from the display unit 13, to the polarizer 14. At this time, the beam ejection unit 12 may take the form of a polarizing beam splitter as described above in order to adjust the path of light in various ways.

Subsequently, the polarizer 14 polarizes the image-forming light introduced from the beam ejection unit 12. At this time, because the polarizer 14 transmits only the p-wave component or the s-wave component of the light and absorbs the other light wave, the light that passes through the polarizer 14 is polarized so as to have only one of the p-wave component and the s-wave component of light. This serves to prevent deterioration in image quality due to interference between the p-wave component and the s-wave component of light, as described above.

Subsequently, the lens 15 serves to receive and enlarge the image-forming light, introduced from the polarizer 14, to a size suitable for viewing by the user with the naked eye. At this time, as described above, a refractor may be formed on a portion of the lens 15 for adjustment of the path of light, and the light that passes through the refractor is introduced to the first prism 16 at a set angle of incidence.

Subsequently, the first prism 16 may serve to adjust the path of the image-forming light transmitted from the lens 15 and to finally emit the image-forming light to the user's eyeball E. At this time, the adjustment of the path of light may be implemented using the total reflection of the first prism 16 or the reflective layer 200 formed on the first prism 16.

The second prism 17 may be coupled to the first prism 16 and may serve to reduce the distortion of the real image that reaches the user's eyeball E. The user can simultaneously view both the virtual image, which is the image played back on the display unit 13, and the real image of an object that is present in front of the user's eyeball E, via the first prism 16.

However, when the user's eyeball E and the end of the first prism 16 are arranged close to each other, the real image, which reaches the user's eyeball E, may be distorted due to the shape of the end of the first prism 16. This is because refraction, diffraction or the like of the light that shows the real image may occur due to the shape of the end of the first prism 16.

Therefore, when the second prism 17 is coupled to the end of the first prism 16 so that the entire prism is extended, it is possible to reduce the distortion of the real image caused by the shape of the end of the first prism 16.

The base 18 may have an accommodation space formed therein, and may serve to accommodate the light guide unit 11, the beam ejection unit 12, the display unit 13, the polarizer 14, and the lens 15 in the accommodation space. The base 18 may have a complicated shape because it accommodates several components of the embodiment. Therefore, the base 18 may be manufactured using a method that enables the manufacture of a complicated structure, for example, injection molding.

The cover member 19 may close at least a portion of the top of the base 18 so as to allow the respective components to be stably accommodated in the base 18. In addition, the cover member 19 may be coupled to the base 18 by the fastening members 22.

In addition, bosses 171 may be formed on the upper surface of the cover member 19, and may be coupled to recesses or holes formed in the printed circuit board 20, whereby the top of the printed circuit board 20 may be coupled to the cover member 19.

The top and bottom of the printed circuit board 20 may be coupled to the base 18 and the cover member 19, and may be electrically connected to the light source unit 10 and the display unit 13. In this way, the printed circuit board 20 may supply required power to the light source unit 10 and the display unit 13.

Meanwhile, the printed circuit board 20 may have recesses or holes formed in the top and bottom thereof. As such, the top and bottom of the printed circuit board 20 may be respectively coupled to the bosses 171 formed on the upper surface of the cover member 19 and the bosses 171 formed on the lower surface of the base 18.

The connector 21 may serve to connect the printed circuit board 20 and an external apparatus to each other. At this time, the external apparatus may include, for example, a controller, which controls the wearable display device of the embodiment, a storage device in which images to be played back are recorded, and a communication device, which may link a mobile appliance, such as, for example, a smart phone, to the wearable display device.

The fastening members 22 may serve to couple the cover member 19 and the base 18 to each other. Thus, the fastening members 22 may be any fastening members so long as they can be inserted into the holes or recesses formed in each of the cover member 19 and the base 18 so as to removably couple the cover member 19 and the base 18. For example, the fastening members 22 may be bolts, screws, or coupling pins.

Figure 4:
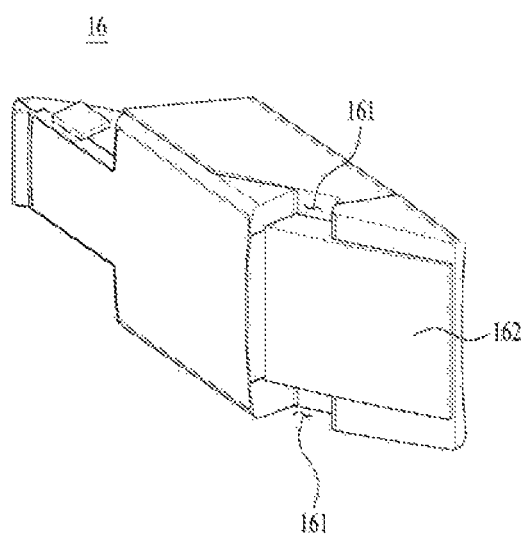
FIG. 4 is a perspective view illustrating a first prism according to one embodiment.
Figure 5:
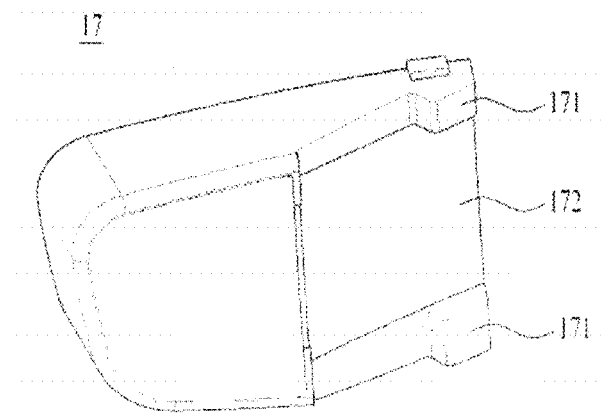
FIG. 5 is a perspective view illustrating a second prism according to one embodiment.

FIG. 4 is a perspective view illustrating the first prism 16 according to one embodiment. FIG. 5 is a perspective view illustrating the second prism 17 according to one embodiment. The first prism 16 may include an indentation 161 and a first inclined surface 162. In addition, the second prism 17 may include a projection 171 and a second inclined surface 172.

The indentation 161 formed in the first prism 16 may include a pair of indentations formed in two opposite sides of the contact area with the second prism 17 so as to be coupled to the second prism 17. The second prism 17 may have projections 17 formed at positions corresponding to the indentations 161 so that the projections 17 are seated in the indentations 161, thereby coupling the first prism 16 and the second prism 17 to each other.

It is preferable to firmly couple the first prism 16 and the second prism 17 to each other. To this end, adhesive materials 300 may be interposed between the projections 171 and the indentations 161, thereby firmly coupling the first prism 16 and the second prism 17. In addition, the adhesive materials 300 may be interposed between the end of the first prism 16 and the end of the second prism 17, excluding the first inclined surface 162 of the first prism 16 and the second inclined surface 172 of the second prism 17, thereby more firmly coupling the first prism 16 and the second prism 17.

The first inclined surface 162 of the first prism 16 is a portion that is formed between the indentations 161 and that is reached by the light that forms a virtual image. In addition, at least a portion of the reflective layer 200 may be disposed on the first inclined surface 162. The embodiment in which the reflective layer 200 is formed will be described later.

The projections 171 of the second prism 17 may include a pair of projections 171 formed in two opposite sides of the contact area with the first prism 16, corresponding to the indentations 161, so as to be coupled to the first prism 16. As described above, the projections 171 may be seated in the indentations 161 formed in the first prism 16, whereby the first prism 16 and the second prism 17 may be coupled to each other.

The second inclined surface 172 of the second prism 17 is a portion that is formed between the projections 171 and that corresponds to the first inclined surface 162. In addition, at least a portion of the coating layer 100 may be disposed on the second inclined surface 172. The embodiment in which the coating layer 100 is formed will be described later.

Figure 6:
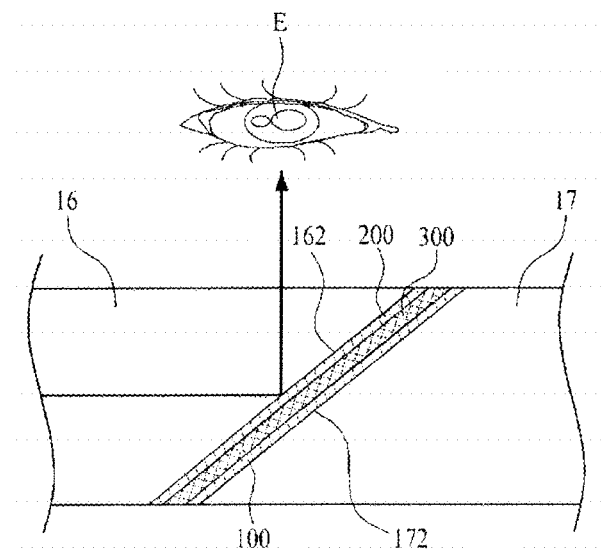
FIGS. 6 and 7 are sectional views illustrating the arrangement of a coating layer and a reflective layer according to embodiments.
Figure 7:
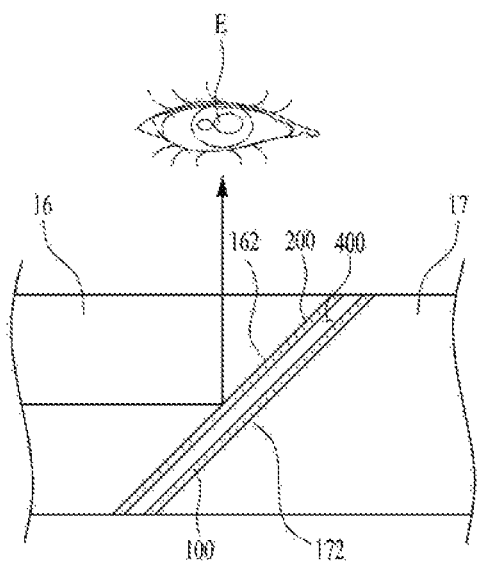

FIGS. 6 and 7 are sectional views illustrating the arrangement of the coating layer 100 and the reflective layer 200 according to embodiments.

The coating layer 100 may be interposed between the first prism 16 and the second prism 17, and may serve to increase the visibility of a virtual image by adjusting the brightness in inverse proportion to the ambient brightness. That is, the coating layer 100 may have properties such that the brightness thereof is decreased when the ambient brightness is increased and, conversely, such that the brightness thereof is increased when the ambient brightness is decreased. The coating layer 100 having such properties may be formed of, for example, a photochromic material.

As such, since the brightness of the coating layer 100 is decreased when the ambient brightness is increased, it is possible to greatly easily visually perceive the image that is projected on the reflective layer 200 disposed close to the coating layer 100, as compared to a structure having no coating layer 100, owing to the brightness contrast, thereby greatly improving the visibility.

Conversely, since the brightness of the coating layer 100 is increased when the ambient brightness is decreased, although the entire image projected on the reflective layer 200 disposed close to the coating layer 100 may be dark and may not be easily visually perceived, it is possible to greatly improve the visibility of the image owing to the increase in the brightness of the coating layer 100.

The reflective layer 200 may be interposed between the coating layer 100 and the first prism 16, and may serve to change the path of light so as to be directed toward the eyeball E. That is, the path of the image-forming light, introduced from the lens 15 to the first prism 16, may be changed so as to be directed toward the user's eyeball E, thereby enabling the user to view the image with the naked eye. At this time, the reflective layer 200 may be formed of a semitransparent or opaque material.

As shown in FIG. 6, the coating layer 100 may be located in the downstream portion of the path of the light that forms a virtual image, that is, the light introduced from the lens 15 to the first prism 16, and the reflective layer 200 may be located in the upstream portion of the path of the light.

When the user views an image with the eyeball E in this structure, the coating layer 100 is always located behind the reflective layer 200 and the brightness thereof varies in inverse proportion to the ambient brightness, thereby improving the visibility of the image that is projected on the reflective layer 200.

The arrangement of the coating layer 100 and the reflective layer 200 according to the embodiment, as shown in FIG. 6, may be made such that the reflective layer 200 is coated on the first inclined surface 162 in the upstream portion of the path of the light that forms a playback virtual image, the coating layer 100 is coated on the second inclined surface 172 in the downstream portion of the path of the light, and the adhesive material 300 is interposed between the reflective layer 200 and the coating layer 100 so as to couple the reflective layer 200 and the coating layer 100 to each other. At this time, the adhesive material 300 may preferably be formed of a transparent material.

Alternatively, as shown in FIG. 7, a space 400 may be provided between the reflective layer 200 and the coating layer 100 without interposing the adhesive material 300 or any other material therebetween. In the embodiments shown in FIGS. 6 and 7, the reflective layer 200 and the coating layer 100 may be respectively disposed on the entire area of the first inclined surface 162 and the entire area of the second inclined surface 172.

Figure 8:
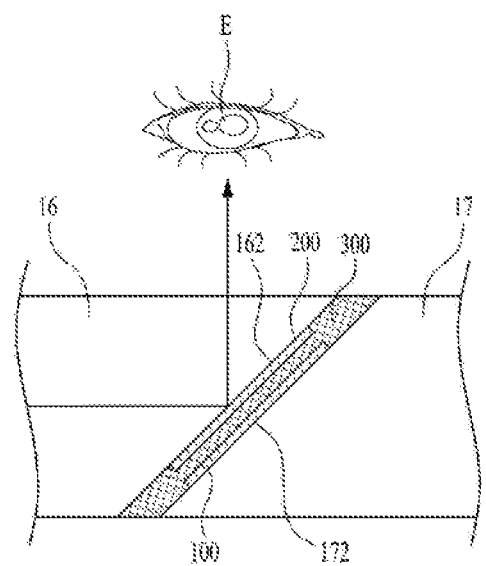
FIGS. 8 and 9 are sectional views illustrating the arrangement of the coating layer and the reflective layer according to other embodiments.
Figure 9:
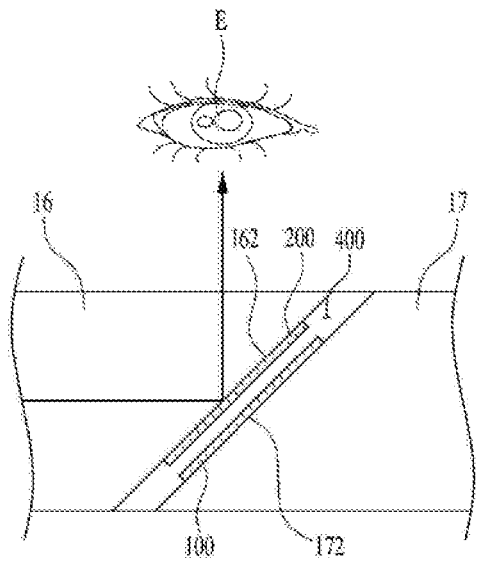

FIGS. 8 and 9 are sectional views illustrating the arrangement of the coating layer 100 and the reflective layer 200 according to other embodiments. In the other embodiments, as shown in FIGS. 8 and 9, the reflective layer 200 and the coating layer 100 may respectively be disposed on a portion of the area of the first inclined surface 162 and a portion of the area of the second inclined surface 172, and at this time the surface area and the shape of the surface of the reflective layer 200 and the surface area and the shape of the surface of the coating layer 100 may be the same.

At this time, the surface area and the shape of the reflective layer 200 may be appropriately set within a range enabling the user to comfortably view the image projected on the reflective layer 200. Further, the shape of the reflective layer 200 may be quadrangular, polygonal other than quadrangular, circular, elliptical, etc.

Figure 10:
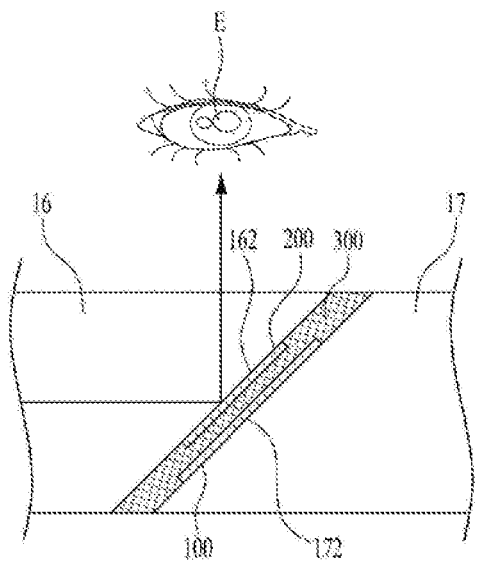
FIGS. 10 and 11 are sectional views illustrating the arrangement of the coating layer and the reflective layer according to further embodiments.
Figure 11:
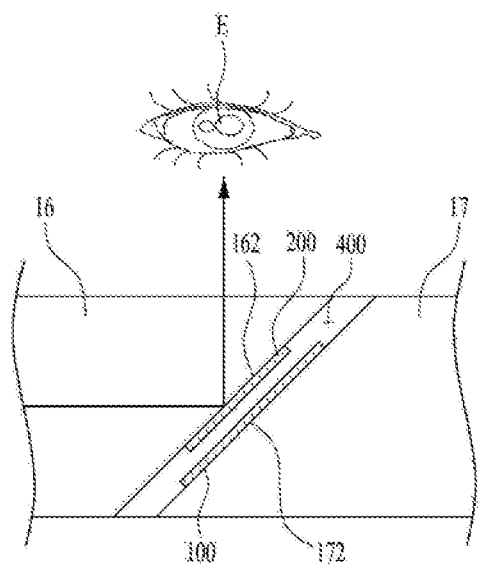

FIGS. 10 and 11 are sectional views illustrating the arrangement of the coating layer 100 and the reflective layer 200 according to further embodiments. In the further embodiments, as shown in FIGS. 10 and 11, the surface area of the reflective layer 200 may be set to be smaller than the surface area of the coating layer 100.

As described above, since the coating layer 100 serves to improve the visibility of the image projected on the reflective layer 200 through adjustment of the brightness thereof in inverse proportion to the ambient brightness, the coating layer 100 may have a larger surface area than the reflective layer 200.

Conversely, if the surface area of the reflective layer 200 is smaller than the surface area of the coating layer 100, the above-described effect of improving the visibility of the image by the coating layer 100 is confined to a portion of the reflective layer 200, and thus the effect obtained by the arrangement of the coating layer 100 may be correspondingly decreased.

Therefore, it is preferable to design the surface areas, the shapes and the arrangement positions of the reflective layer 200 and the coating layer 100 so that the entire area of the reflective layer 200 is included in the coating layer 100 when viewed in the direction in which the user's eyeball E is oriented.

Figure 12:
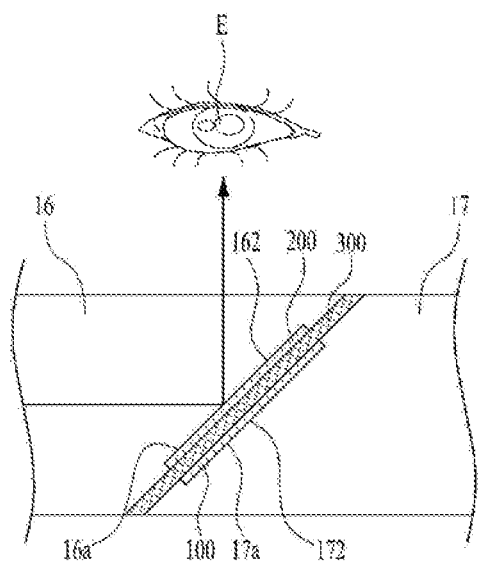
FIGS. 12 and 13 are sectional views illustrating the arrangement of the coating layer and the reflective layer according to further embodiments.
Figure 13:
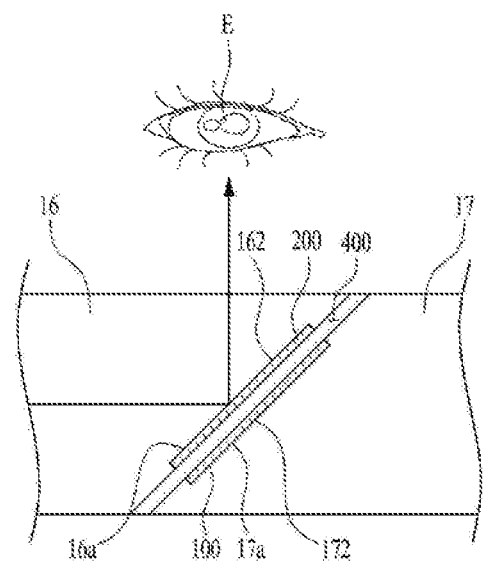

FIGS. 12 and 13 are sectional views illustrating the arrangement of the coating layer 100 and the reflective layer 200 according to further embodiments. In the further embodiments, as shown in FIGS. 12 and 13, the first inclined surface 162 may have a first groove 16a formed in at least a portion of the first inclined surface 162, and the reflective layer 200 may be seated in the first groove 16a. In addition, the second inclined surface 172 may have a second groove 17a formed in at least a portion of the second inclined surface 172, and the coating layer 100 may be seated in the second groove 17a.

The respective embodiments related to the arrangement of the coating layer 100 and the reflective layer 200 have been described above with reference to FIGS. 6 to 13. However, it is also possible to implement other arrangement configurations of the coating layer 100 and the reflective layer 200 by combining the above-mentioned embodiments.

According to the embodiments, the reflective layer 200 is disposed in the upstream portion of the path of the light that forms a virtual image, the coating layer 100 is disposed in the downstream portion of the path of the light, and the brightness of the reflective layer 200 is adjusted in inverse proportion to the ambient brightness, which has the effect of improving the visibility of the virtual image.

In addition, since the reflective layer 200 and the coating layer 100 may be respectively coated on the first inclined surface 162 and the second inclined surface 172, which are surrounded by the edge of the end of the first prism 16 and the edge of the end of the second prism 17, the layers are not exposed outside the prisms. Accordingly, the occurrence of scratches or damage, particularly attributable to external exposure of the coating layer 100, may be greatly reduced, and consequently the durability of the coating layer 100 may be enhanced.

Second Embodiment

Figure 14:
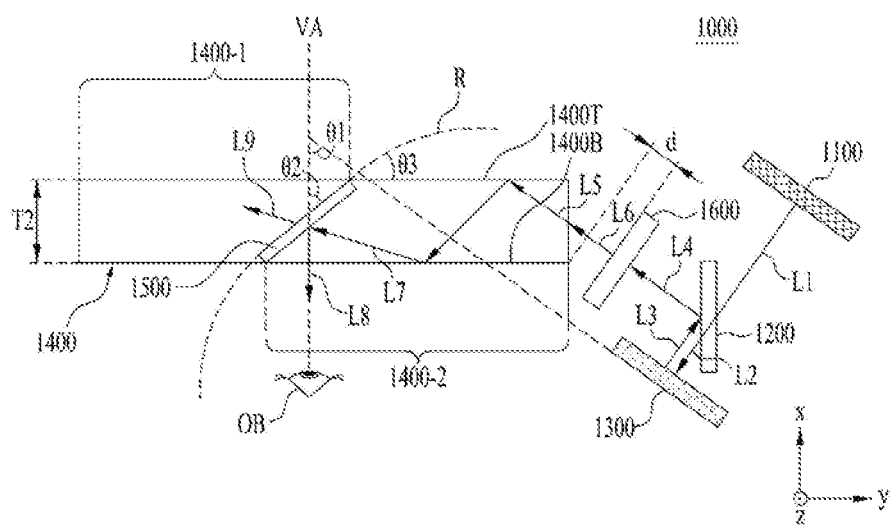
FIG. 14 illustrates a conceptual view of a wearable display device according to a second embodiment.

FIG. 14 illustrates a conceptual view of a wearable display device 1000 according to a second embodiment.

The wearable display device 1000 shown in FIG. 14 may include a light source 1100, a first beam splitter 1200, an image generator (or a display element) 1300, a front prism 1400, a second beam splitter 1500, and a lens 1600.

The light source 1100 emits light L1 to the first beam splitter 1200. For example, the light source 1100 may include at least one of a light-emitting diode and a laser diode, but the disclosure is not limited to this kind of light source 1100.

The first beam splitter 1200 transmits the light L1 emitted from the light source 1100, and the transmitted light L2 is introduced to the image generator 1300.

The image generator 1300 may generate a light pattern, which forms a virtual image, from the light L2 that passes through the first beam splitter 1200, and may be disposed at a first predetermined angle θ1 with respect to a viewing axis VA (i.e. the x-axis direction).

Here, the virtual image may include a variety of information. For example, when the observer OB is a driver, the virtual image may include traveling information required for driving, and when the observer OB is a student, the virtual image may include information required for learning.

Further, the image generator 1300 may be a liquid crystal on silicon (LCOS), an organic light-emitting diode (OLED), or a micro-mirror display such as a digital light projector (DLP).

In addition, the image generator 1300 may generate a light pattern by spatially modulating the light L2 that passes through the first beam splitter 1200.

Although not illustrated, a printed circuit board may be disposed neighboring or adjacent to the image generator 1300. The printed circuit board may include an electronic circuit (not shown) for driving the image generator 1300 and a connector for connecting the image generator 1300 to other components.

In addition, the light pattern generated by the image generator 1300 may be monochromatic or may include multiple colors, such as red, green, and blue (RGB).

At least one of the light source 1100, the first beam splitter 1200 and the image generator 1300 may be spaced apart from the front prism 1400. For example, as shown in FIG. 14, each of the light source 1100, the first beam splitter 1200 and the image generator 1300 may be spaced apart from the front prism 1400.

The light L3 that corresponds to the light pattern generated by the image generator 1300 may be reflected by the first beam splitter 1200 and may be introduced to the front prism 1400.

The above-mentioned first beam splitter 1200 may include a polarization beam splitter. In this case, the polarization beam splitter 1200 may transmit the p-polarized light L1 that is emitted from the light source 1100. At this time, the image generator 1300 generates a light pattern corresponding to a virtual image using the p-polarized light L1, and converts p-polarization of the generated light pattern into s-polarization. Subsequently, the polarization beam splitter 1200 may reflect the s-polarized light L3 that corresponds to the light pattern generated by the image generator 1300.

The lens 1600 serves to perform focusing so that the light L4 corresponding to the light pattern reflected by the first beam splitter 120 is directed to the front prism 1400. According to the embodiment, the lens 1600 may be an aspheric lens. Alternatively, the lens 1600 may be, for example, a collimator lens, a spherical lens, or a magnifying lens, but the disclosure is not limited to these shapes of the lens 1600.

In addition, the lens 160 may be spaced apart from the front prism 1400 by a predetermined distance d.

Figure 15:
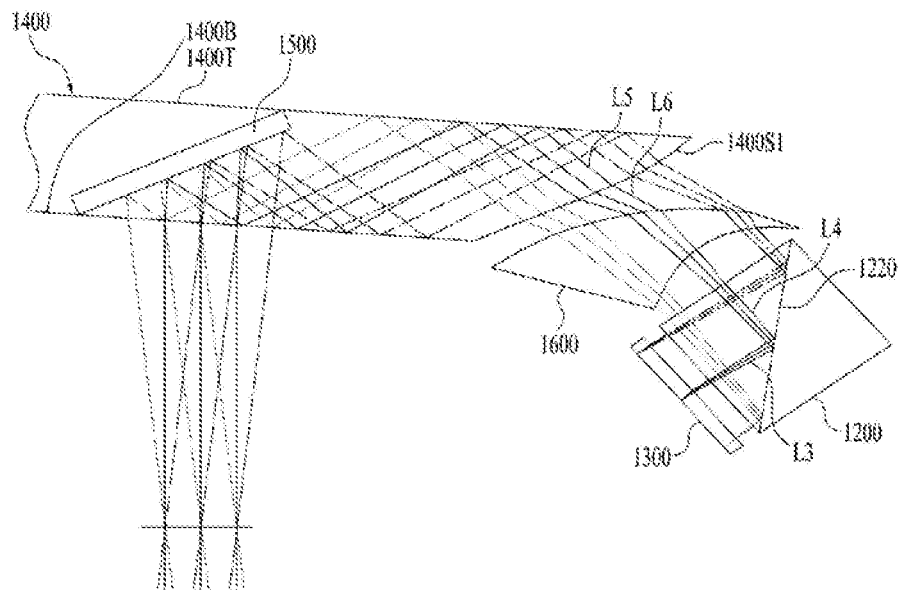
FIG. 15 is a view for explaining focusing and total reflection of a lens shown in FIG. 14.

FIG. 15 is a view for explaining focusing and total reflection of the lens 1600 shown in FIG. 14.

Referring to FIG. 15, a beam-splitting interface 1220 of the first beam splitter 1200 reflects the light L3 that corresponds to the light pattern generated by the image generator 130. The light L4 reflected by the beam-splitting interface 122 is focused on the lens 1600, and the focused light L6 is introduced to the front prism 1400. At this time, the light L6 focused on the lens 1600 may be refracted by a light-incident surface 1400S1 of the front prism 140 and may then be introduced thereto.

Depending on embodiments, the lens 1600 may be omitted.

Meanwhile, the front prism 1400 may reflect the light L5, which corresponds to the light pattern that is generated by the image generator 1300, is reflected by the first beam splitter 1200 and is introduced to the front prism 1400 through the lens 1600, a predetermined number of times.

When the predetermined number of times of total reflection of the light L5 in the front prism 1400 is an even number, the first predetermined angle θ1 with respect to the viewing axis VA may be in the range from 35° to 45°, for example 40°. Alternatively, when the predetermined number of times of total reflection of the light L5 in the front prism 1400 is an odd number, the first predetermined angle θ1 may be in the range from −45° to −15°, for example −40°. Here, the minimum value of the predetermined number of times may be 2, and in this case, as shown in FIG. 15, the light L5 may be totally reflected twice in the front prism 1400.

For example, as shown in FIG. 14, when the light L5 is totally reflected twice in the front prism 1400, the first predetermined angle θ1 may be 40°, but the disclosure is not limited to this number of times of total reflection or to any specific value of the first predetermined angle θ1.

Referring back to FIG. 14, a top surface 1400T and a bottom surface 1400B of the front prism 1400 may include a reflective material, which reflects the light L5 that is reflected by the first beam splitter 1200 and is introduced to the front prism 1400 through the lens 1600. Further, the front prism 1400 may be formed of a transparent material, but the disclosure is not limited as to the material of the front prism 1400.

Figure 16:
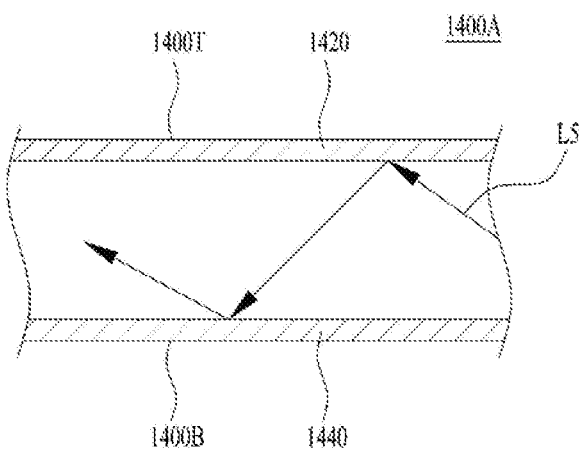
FIG. 16 illustrates a sectional view of an embodiment of a front prism shown in FIG. 14.

FIG. 16 illustrates a sectional view of an embodiment 1400A of the front prism 1400 shown in FIG. 14.

As illustrated in FIG. 16, the front prism 1400 may include first and second reflective layers 1420 and 1440. The first reflective layer 1420 may be disposed inside the top surface 1400T of the front prism 1400, and the second reflective layer 1440 may be disposed inside the bottom surface 1400B of the front prism 1400. For example, the first and second reflective layers 1420 and 1440 may be coating layers that are respectively coated on the top surface 1400T and the bottom surface 1400B.

In addition, each of the first and second reflective layers 1420 and 1440 may have a structure in which multiple layers are stacked. In this case, the light L5, which is reflected by the first beam splitter 1200 and is introduced to the front prism 1400, may be totally reflected by the first and second reflective layers 1420 and 1440.

Referring to FIG. 14, the front prism 1400 may include two sub-prisms 1400-1 and 1400-2, which are split in the horizontal direction (i.e. the y-axis direction perpendicular to the direction of the viewing axis VA) with respect to the second beam splitter 1500. The two sub-prisms 1400-1 and 1400-2 arranged in the y-axis direction may have the same configuration. That is, the lengths of the two sub-prisms 1400-1 and 1400-2 may be the same, and the radii of curvature of the top and bottom surfaces of the two sub-prisms 1400-1 and 1400-2 may be the same.

As such, when the front prism 1400 is split into the two sub-prisms 1400-1 and 1400-2 having the same configuration with respect to the second beam splitter 1500, it is possible to prevent the distortion of a real-world environment image around the observer OB, which the observer OB views with the observer's eye.

Alternatively, the two sub-prisms 1400-1 and 1400-2 may have different configurations.

Meanwhile, the second beam splitter 1500 may be disposed so as to be inclined at a second predetermined angle θ2 with respect to the viewing axis VA within the front prism 1400. The second beam splitter 1500 disposed in the inclined manner may reflect light L7, which is totally reflected in the front prism 1400, toward the observer OB along the viewing axis VA. Therefore, the observer OB may observe a virtual image corresponding to the light reflected along the viewing axis VA.

At this time, the second predetermined angle θ2 may be expressed by the following equation 1.

$$\theta2=90°-\theta3 \quad \text{Equation 1}$$

Here, θ3 represents a third predetermined angle, which is an angle at which the second beam splitter 1500 is inclined with respect to the horizontal plane extending in the y-axis direction perpendicular to the viewing axis VA.

For example, the minimum value of the second predetermined angle θ2 at which the second beam splitter 1500 is inclined with respect to the viewing axis VA may be 62°, and the maximum value of the third predetermined angle θ3 may be 28°, but the disclosure is not limited thereto.

If the first predetermined angle θ1 is less than 35° (or −45°), the image generator 1300 is positioned close to the face of the observer OB, which may cause a problem due to heat generated by the image generator 1300.

Alternatively, if the first predetermined angle θ1 is increased so as to exceed, for example, 45° (or −15°), the third predetermined angle θ3 is increased, which may cause a further increase in the length in the y-axis direction of the front prism 1400 or a further reduction in the radius of curvature R of the second beam splitter 1500 so that the number of times of total reflection in the front prism 1400 is, for example, 2. Therefore, when the predetermined number of times is an even number, the first predetermined angle θ1 may be in the range from 35° to 45°, and when the predetermined number of times is an odd number, the first predetermined angle θ1 may be in the range from −45° to −15°.

According to the embodiment, since the maximum value of the third predetermined angle θ3 may be 28°, which is less than 45° of a general trigonal prism, it is not necessary to increase the length of the front prism 1400 while adjusting the number of times of total reflection in the front prism 1400 to be 2.

For example, when the first predetermined angle θ1 is constant, the radius of curvature R of the second beam splitter 1500 and the third predetermined angle θ3 may be in proportion to each other. Alternatively, when the third predetermined angle θ3 is constant, the radius of curvature R of the second beam splitter 1500 may be in proportion to the length in the y-axis direction of the front prism 1400 and may also be in proportion to the first predetermined angle θ1. Alternatively, when the radius of curvature R of the third beam splitter 1500 is constant, the third predetermined angle θ3 may be in proportion to the first predetermined angle θ1 and may also be in proportion to the length in the y-axis direction of the front prism 1400.

It is possible to achieve a reduction in the size and the weight of the wearable display device 1000 by adjusting the length or the thickness of the front prism 1400 in consideration of the relationship between the first predetermined angle θ1, the third predetermined angle θ3, the radius of curvature R of the second beam splitter 1500, and the length of the front prism 1400.

Figure 17:
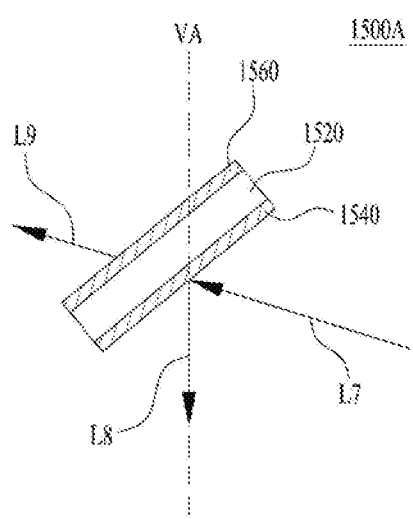
FIG. 17 illustrates a sectional view of an embodiment of a second beam splitter shown in FIG. 14.

FIG. 17 illustrates a sectional view of an embodiment 1500A of the second beam splitter 1500 shown in FIG. 14.

Referring to FIG. 17, the second beam splitter 1500A may include a frame 1520 and coating layers 1540 and 1560. The coating layers 1540 and 1560 may be coated on the frame 152, and may reflect (L8) a portion of the totally reflected light L7 along the viewing axis (VA) and may transmit (L9) the remainder of the light L7.

Further, the second beam splitter 1500 may be implemented as a mirror. The mirror may reflect a portion of the totally reflected light L7 along the viewing axis VA. At this time, the light L8 reflected by the mirror may be shown to the observer OB as a virtual image. In addition, the mirror may transmit the remainder of the totally reflected light L7.

In addition, the mirror 1500 may reflect 40% to 80% of the totally reflected light L7 and may transmit 80% to 40% of the totally reflected light L7. For example, a portion, e.g. 60%, of the totally reflected light L7 may be reflected by the mirror 1500 and may be emitted (L8) so that the observer OB can view the same, and the remainder, i.e. 40%, of the totally reflected light L7 may be transmitted (L9) through the mirror 1500. Alternatively, a portion, e.g. 50%, of the totally reflected light L7 may be reflected by the mirror 1500 and may be emitted (L8) so that the observer OB can view the same, and the remainder, i.e. 50%, of the totally reflected light L7 may be transmitted (L9) through the mirror 1500.

In addition, the radius of curvature R of the mirror 150 may be 62 mm, but the disclosure is not limited thereto.

The material of each of the above-mentioned first and second beam splitters 1200 and 1500 may be glass or plastic, but the disclosure is not limited to this material.

Although not illustrated, a window may be disposed adjacent to the front prism 1400. In this case, the light corresponding to the real image may be transmitted from the second beam splitter 1500 through the window, and a combination of the virtual image and the real image may therefore be shown to the observer OB.

For example, the distance to which the virtual image to be shown to the observer OB is projected may be in the range of 0.5 m to 4 m, but the disclosure is not limited thereto. That is, the wearable display device 1000 may show a virtual image at a position desired by the observer OB.

Figure 18:
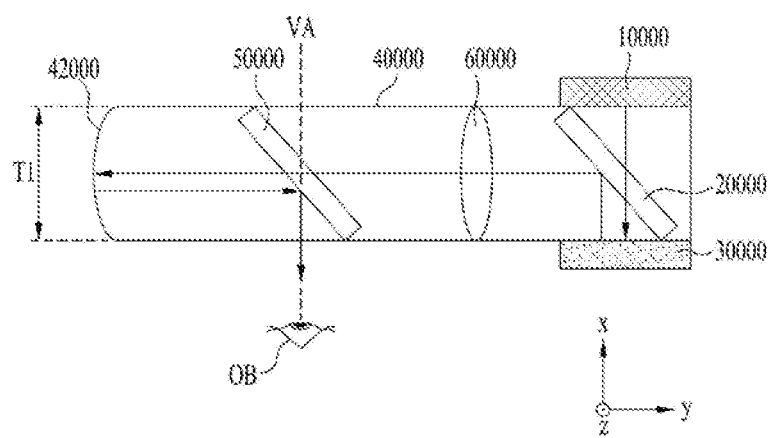
FIG. 18 illustrates a schematic perspective view of a wearable display device according to a comparative example.

FIG. 18 illustrates a schematic perspective view of a wearable display device according to a comparative example.

A wearable display device according to the comparative example shown in FIG. 18 includes a light source 10000, a first beam splitter 20000, an image generator 30000, a light pipe 40000, a second beam splitter 50000, and a lens 60000.

The first beam splitter 20 transmits light emitted from the light source 10000, and the image generator 30000 generates a light pattern corresponding to a virtual image using the light transmitted from the first beam splitter 20000 and transmits the light corresponding to the light pattern to the first beam splitter 20000. At this time, the light transmitted from the image generator 30000 is reflected by the first beam splitter and is then transmitted to the second beam splitter 50000 through the lens 60000. Subsequently, the second beam splitter 50000 transmits the light introduced thereto through the lens 60000, the light transmitted from the second beam splitter 50000 is reflected by a reflective surface 42000 of the light pipe 40000 and is formed into a virtual image, and the light corresponding to the virtual image is reflected by the second beam splitter 50000 in the direction of the viewing axis VA and is shown to the observer OB as a virtual image.

In the case of FIG. 18, the light source 10000, the first beam splitter 20000, the image generator 30000 and the lens 60000 may be formed in contact with the light pipe 40000, without being spaced apart therefrom, or may be integrally formed with the light pipe 40000.

On the other hand, in the wearable display device 1000 according to the embodiment shown in FIG. 14, each of the light source 1100, the first beam splitter 1200, the image generator 1300 and the lens 1600 is spaced apart from the front prism 1400. As such, in the case in which at least one of the light source 1100, the first beam splitter 1200, the image generator 1300 and the lens 1600 is spaced apart from the front prism 1400, the number of factors (e.g. 'd' shown in FIG. 14) that enable adjustment of the resolution of a virtual image may be increased. Accordingly, for example, a letter included in a virtual image shown to the observer OB by the wearable display device 1000 according to the embodiment shown in FIG. 14 may be displayed smaller and more clearly than a letter included in a virtual image shown to the observer OB by the wearable display device according to the comparative example shown in FIG. 18. As a result, the resolution of the wearable display device 1000 according to the embodiment may be higher than the resolution of the wearable display device according to the comparative example shown in FIG. 18.

Further, in the wearable display device according to the comparative example shown in FIG. 14, the observer OB and the image generator 30000 are positioned in the same horizontal plane, i.e. the yz-plane. That is, the image generator 30000 is disposed in the direction perpendicular to the viewing axis VA.

On the other hand, in the wearable display device 1000 according to the embodiment shown in FIG. 14, the image generator 1300 is disposed in an inclined manner at the first predetermined angle θ1 with respect to the viewing axis VA. As such, in the case in which the image generator 130 is disposed in an inclined manner at the first predetermined angle θ1, a second thickness T2 of the front prism 1400 in the wearable display device 1000 shown in FIG. 14 may be reduced below a first thickness T1 of the light pipe 40000 in the wearable display device shown in FIG. 18. As such, since the second thickness T2 of the front prism 140 is less than the first thickness T1, the wearable display device 1000 shown in FIG. 14 may be made small and light. As a result of the small second thickness T2 and the reduction in the weight, the comfort of the observer OB wearing the wearable display device 1000 shown in FIG. 14 may be improved.

Further, in the case of the wearable display device according to the comparative example shown in FIG. 18, the light that passes through the lens 60000 is first transmitted through the second beam splitter 50000, is secondarily reflected by the second beams splitter 50000, and is then shown to the observer OB as a virtual image, which may cause increased light loss.

On the other hand, in the case of the wearable display device 1000 shown in FIG. 14, the light, which is first reflected by the second beam splitter 50000, is shown to the observer OB as a virtual image, and as a result, the light efficiency of the wearable display device 1000 according to the embodiment shown in FIG. 14 may be doubled compared to that of the wearable display device shown in FIG. 18, and a high-pixel virtual image having a high-definition (HD) resolution may be shown to the observer OB.

Meanwhile, the above-described wearable display device 1000 according to the embodiment shown in FIG. 14 is applicable to various fields. For example, the wearable display device 1000 may be applied to head-mounted displays (HMDs), wearable computing apparatuses, or head-up displays (HUDs).

Figure 19:
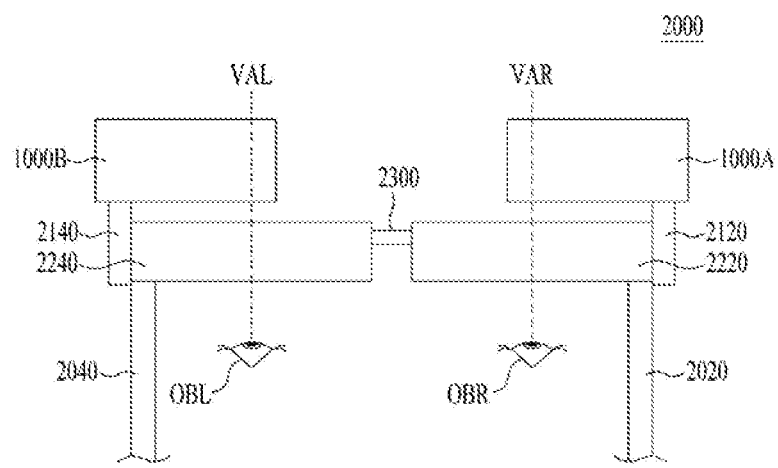
FIG. 19 is a view illustrating the external appearance of an HMD according to an embodiment.

FIG. 19 is a view illustrating the external appearance of an HMD 2000 according to an embodiment.

The HMD 2000 shown in FIG. 19 may include first and second wearable display devices 1000A and 1000B, first and second lateral frames 2020 and 2040, first and second connection frames 2120 and 2140, first and second glasses frames 2220 and 2240, and a bridge frame 2300.

Each of the first and second wearable display devices 1000A and 1000B may correspond to the wearable display device 1000 shown in FIG. 14. Therefore, a viewing axis VAR of the first wearable display device 1000A corresponds to the viewing axis VA of the wearable display device 1000 shown in FIG. 14, and a viewing axis VAL of the second wearable display device 1000B corresponds to the viewing axis VA of the wearable display device 1000 shown in FIG. 14. Therefore, the internal construction of each of the first and second wearable display devices 1000A and 1000B is as illustrated in FIG. 14.

When the HMD 2000 shown in FIG. 19 is worn on the observer OB, the left viewing axis VAL is aligned with the left pupil OBL of the observer OB, and the right viewing axis VAR is aligned with the right pupil OBR of the observer OB.

The bridge frame 2300 serves to connect the first and second glasses frames 2220 and 2240 to each other, and may be supported by the nose of the observer OB. Further, the first and second lateral frames 2020 and 2040 are respectively connected to the first and second glasses frames 2220 and 2240, and may be supported by the ears of the observer OB.

The first and second wearable display devices 1000A and 1000B may be respectively attached to the first and second glasses frames 2220 and 2240 by the first and second connection frames 2120 and 2140. In addition, the first and second connection frames 2120 and 2140 may be formed in a fixed type, or may be formed in a movable type that is capable of moving the first and second wearable display devices 1000A and 1000B in the horizontal direction, that is, in the direction perpendicular to the viewing axes VAL and VAR.

The construction of the HMD 2000 shown in FIG. 19 is merely illustrative, and the HMD may be implemented in various other configurations.

Figure 20:
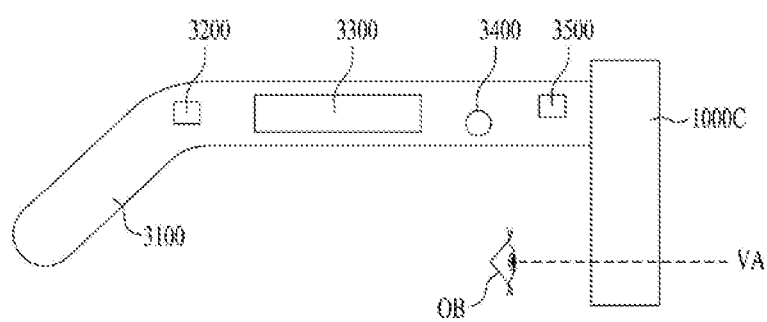
FIG. 20 is a view illustrating the external appearance of a wearable computing apparatus.

FIG. 20 is a view illustrating the external appearance of a wearable computing apparatus 3000.

The wearable computing apparatus 3000 shown in FIG. 20 may include a wearable display device 1000C, a lateral frame 3100, a computer 3200, a touch pad 3300, a microphone 3400, and a sensor 3500.

In the computing apparatus 3000 shown in FIG. 20, the wearable display device 1000C may correspond to the wearable display device 1000 shown in FIG. 14. Therefore, the viewing axis VA of the observer OB corresponds to the viewing axis VA of the wearable display device 1000 shown in FIG. 14. The internal construction of the wearable display device 1000C shown in FIG. 20 may be the same as that of the wearable display device 1000 illustrated in FIG. 14.

The computer 3200 controls the image generator 1300 of the wearable display device 1000C so as to generate a virtual image and to show the same to the observer OB. That is, the computer 3200 may provide the image generator 1300 with data related to a virtual image to be generated by the image generator 130. To this end, the computer 3200 communicates with the image generator 1300 of the wearable display device 1000C in a wireless or wired manner so as to transmit and receive data to and from the image generator 1300.

In addition, the computer 3200 may also communicate with another computer (not shown) or any other appliances, present outside the computing apparatus 3000, in a wireless or wired manner.

The computer 3200 may change or adjust the content of the virtual image in response to various commands. The wearable display device 1000C or the image generator 1300 of the device 1000C may communicate with the observer OB through the touch pad 3300, the microphone 3400 and the sensor 3500. For example, the observer OB may input a command to the computer 3200 by manipulating the touch pad 3300 or by voice input through the microphone 3400. In addition, the sensor 3500 may include an accelerometer or a gyroscope, may detect the operation of the computing apparatus 3000 shown in FIG. 20, and may input a command to the computer 3200 in accordance with the detection result.

The above-described computing apparatus 3000 shown in FIG. 20 is merely another example to which the wearable display device 1000 according to the embodiment shown in FIG. 14 is applied, and the wearable display device 1000C may be applied to the computing apparatus 3000 in various other configurations.

Although only several embodiments have been described above, various other embodiments are possible. The technical contents of the above-described embodiments may be combined into various forms as long as they are not incompatible with one another, and thus, may be implemented in new embodiments.

INDUSTRIAL APPLICABILITY

A wearable display device according to the embodiments improves the visibility of a playback image and is reduced in size and weight, and accordingly the wearable display device of the embodiments has industrial applicability.

The invention claimed is:

1. A wearable display device comprising:
   a light source;
   a first beam splitter for transmitting light emitted from the light source;
   an image generator for generating a light pattern forming a virtual image from the light transmitted from the first beam splitter, the image generator being disposed in an inclined manner at a first predetermined angle with respect to a viewing axis;
   a front prism for totally reflecting light, corresponding to the light pattern generated by the image generator and being reflected by the first beam splitter, a predetermined number of times;
   a second beam splitter disposed in the front prism in an inclined manner at a second predetermined angle with respect to the viewing axis to reflect the totally reflected light along the viewing axis; and
   a lens for performing focusing so that the light corresponding to the light pattern reflected by the first beam splitter is directed to the front prism;
   wherein at least one of the first beam splitter and the image generator is spaced apart from the front prism;
   wherein the second beam splitter comprises a frame and a first coating layer coated on an upper surface of the frame and a second coating layer coated on a bottom surface of the frame to reflect a portion of the totally reflected light along the viewing axis and transmit a remainder of the totally reflected light,
   wherein when the predetermined number of times is configured to be an even number, the first predetermined angle is in a range between 35° and 45°; and when the predetermined number of times is configured to be an odd number, the first predetermined angle is in a range between −45° and −15°,
   wherein the second beam splitter is inclined at a third predetermined angle with respect to a horizontal plane extending in a first direction perpendicular to the viewing axis,
   wherein a maximum value of the third predetermined angle is 28°,
   wherein the predetermined number of times is 2, and
   wherein when the first predetermined angle is constant, a radius of curvature of the second beam splitter is in proportion to the third predetermined angle.

2. The wearable display device according to claim 1, wherein the first beam splitter includes a polarization beam splitter, the polarization beam splitter transmitting p-polarized light emitted from the light source and reflecting s-polarized light that corresponds to the light pattern generated by the image generator.

3. The wearable display device according to claim 1, wherein the second beam splitter includes a mirror, the mirror reflecting a portion of the totally reflected light along the viewing axis and transmitting a remainder of the totally reflected light.

4. The wearable display device according to claim 1, wherein the front prism has a top surface and a bottom surface, the top surface and the bottom surface including a reflective material to reflect the light reflected by the first beam splitter.

5. The wearable display device according to claim 1, wherein the front prism includes:
   a first reflective layer disposed on a top surface of the front prism; and
   a second reflective layer disposed on a bottom surface of the front prism,
   wherein the light reflected by the first beam splitter is totally reflected by the first and second reflective layers.

6. The wearable display device according to claim 1, wherein the front prism includes two sub-prisms, the sub-prisms being split in a horizontal direction with respect to the second beam splitter, and
   wherein the two sub-prisms have a same configuration with respect to the second beam splitter.

7. The wearable display device according to claim 3, wherein the mirror reflects 40% to 80% of the totally reflected light and transmits 80% to 40% of the totally reflected light.

8. The wearable display device according to claim 1, wherein a minimum value of the predetermined number of times is 2.

9. The wearable display device according to claim 1, wherein a minimum value of the second predetermined angle is 62°.

10. The wearable display device according to claim 1, wherein the light source includes at least one of a light-emitting diode and a laser diode emitting a light to the first beam splitter.

11. The wearable display device according to claim 1, wherein the image generator is a liquid crystal on silicon (LCOS), an organic light-emitting diode (OLED), or a digital light projector (DLP).

12. The wearable display device according to claim 1, wherein the light source is spaced apart from the front prism.

13. The wearable display device according to claim 1, comprising:
   wherein the lens is a collimator lens, a spherical lens, or a magnifying lens.

14. The wearable display device according to claim 1, wherein the front prism is formed of a transparent material.

15. The wearable display device according to claim 6, wherein lengths of the two sub-prisms are the same, and
   wherein radii of curvatures of top and bottom surfaces of the two sub-prisms are the same.

16. A wearable display device, comprising:
   a light source;
   a first beam splitter for transmitting light emitted from the light source;
   an image generator for generating a light pattern forming a virtual image from the light transmitted from the first beam splitter, the image generator being disposed in an inclined manner at a first predetermined angle with respect to a viewing axis;
   a front prism for totally reflecting light, corresponding to the light pattern generated by the image generator and being reflected by the first beam splitter a predetermined number of times;
   a second beam splitter disposed in the front prism in an inclined manner at a second predetermined angle with respect to the viewing axis to reflect the totally reflected light along the viewing axis; and
   a lens for performing focusing so that the light corresponding to the light pattern reflected by the first beam splitter is directed to the front prism,
   wherein at least one of the first beam splitter and the image generator is spaced apart from the front prism;
   wherein the second beam splitter is inclined at a third predetermined angle with respect to a horizontal plane extending in a first direction perpendicular to the viewing axis,
   wherein a maximum value of the third predetermined angle is 28°,
   wherein the predetermined number of times is 2,
   wherein the second beam splitter comprises a frame and a first coating layer coated on an upper surface of the frame and a second coating layer coated on a bottom surface of the frame to reflect a portion of the totally reflected light along the viewing axis and transmit a remainder of the totally reflected light,
   wherein when the predetermined number of times is configured to be an even number, the first predetermined angle is in a range between 35° and 45°; and when the predetermined number of times is configured to be an odd number, the first predetermined angle is in a range between −45° and −15°, and
   wherein, when the third predetermined angle is constant, a radius of curvature of the second beam splitter is in proportion to a length in the first direction of the front prism, and is in proportion to the first predetermined angle.

17. A wearable display device, comprising:
   a light source;
   a first beam splitter for transmitting light emitted from the light source;
   an image generator for generating a light pattern fondling a virtual image from the light transmitted from the first beam splitter, the image generator being disposed in an inclined manner at a first predetermined angle with respect to a viewing axis;
   a front prism for totally reflecting light, corresponding to the light pattern generated by the image generator and being reflected by the first beam splitter a predetermined number of times;
   a second beam splitter disposed in the front prism in an inclined manner at a second predetermined angle with respect to the viewing axis to reflect the totally reflected light along the viewing axis; and
   a lens for performing focusing so that the light corresponding to the light pattern reflected by the first beam splitter is directed to the front prism,
   wherein at least one of the first beam splitter and the image generator is spaced apart from the front prism;
   wherein the second beam splitter is inclined at a third predetermined angle with respect to a horizontal plane extending in a first direction perpendicular to the viewing axis,
   wherein a maximum value of the third predetermined angle is 28°,
   wherein the predetermined number of times is 2,
   wherein the second beam splitter comprises a frame and a first coating layer coated on an upper surface of the frame and a second coating layer coated on a bottom surface of the frame to reflect a portion of the totally reflected light along the viewing axis and transmit a remainder of the totally reflected light,
   wherein when the predetermined number of times is configured to be an even number, the first predetermined angle is in a range between 35° and 45°; and when the predetermined number of times is configured to be an odd number, the first predetermined angle is in a range between −45° and −15°, and wherein, when a radius of curvature of the second beam splitter is constant, the third predetermined angle is in proportion to the first predetermined angle and is in proportion to a length in the first direction of the front prism.

* * * * *